United States Patent [19]

Dietrich

[11] Patent Number: 4,469,549
[45] Date of Patent: Sep. 4, 1984

[54] HEAT SEAL APPARATUS

[75] Inventor: Darrel R. Dietrich, Shawnee County, Kans.

[73] Assignee: Cavalier Products, Inc., St. Louis, Mo.

[21] Appl. No.: 560,985

[22] Filed: Dec. 13, 1983

[51] Int. Cl.³ .......................... B30B 3/00; B32B 31/20
[52] U.S. Cl. .................................. 156/579; 29/110.5; 29/132; 156/583.1; 219/244
[58] Field of Search ...................... 156/574, 579, 583.1, 156/582; 29/110.5, 132; 219/244, 258

[56] References Cited

U.S. PATENT DOCUMENTS

| | | |
|---|---|---|
| 2,208,729 | 7/1940 | Offutt ................................ 29/110.5 |
| 2,430,920 | 11/1947 | Dodge ................................. 156/579 |
| 3,857,015 | 12/1974 | Clark et al. ......................... 156/579 |
| 4,310,365 | 1/1982 | Elliott et al. ....................... 156/582 |

Primary Examiner—Michael G. Wityshyn
Attorney, Agent, or Firm—Paul M. Denk

[57] ABSTRACT

Heat seal apparatus is disclosed which comprises a heater unit having a heater therein and a roller insertable in and removable from the heater unit. The roller, when in the heater unit, is in heat transfer relation with the heater so as to be heated to a predetermined temperature level. When the roller is removed for application on a package for heat sealing purposes, the heat stored in the roller performs the heat sealing function thus obviating the need for a heater located within the roller and for a power cord connected to the roller. The roller is a sealed, hollow tube filled with a suitable heat storage medium, such as paraffin or another low vapor pressure, high heat capacity compound, so as to ensure sufficient heat capacity in the roller for heat sealing purposes, to ensure uniform roller temperatures, and to require only a localized contact with the heater for substantially uniformly heating the roller.

6 Claims, 10 Drawing Figures

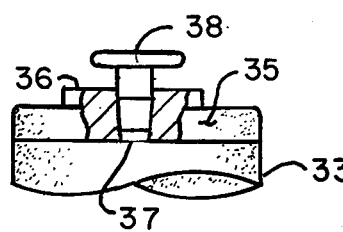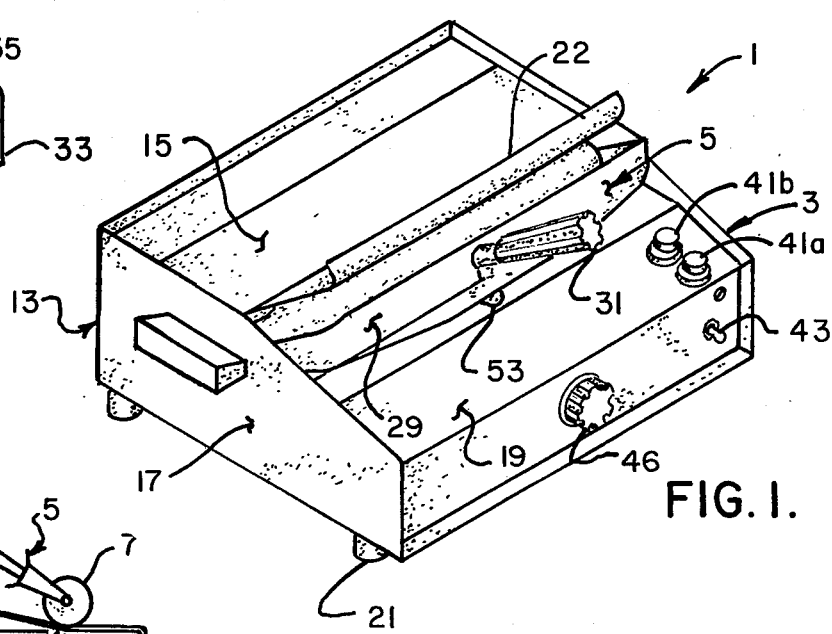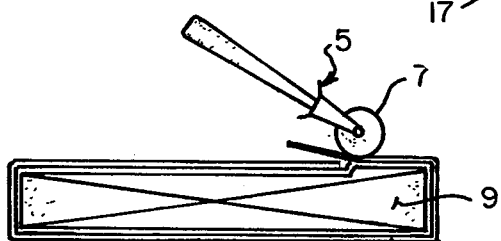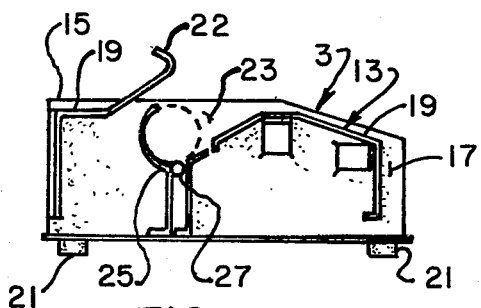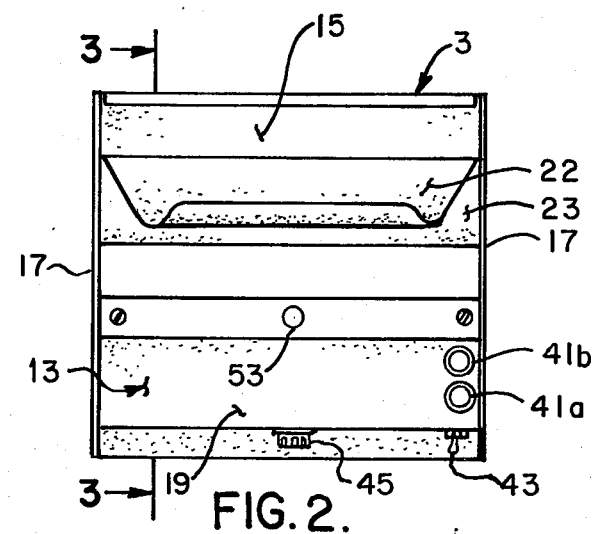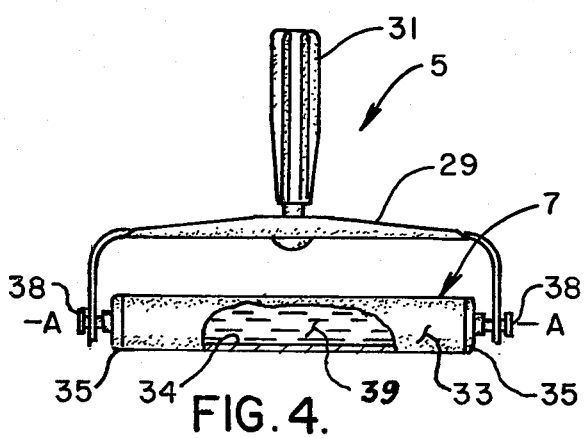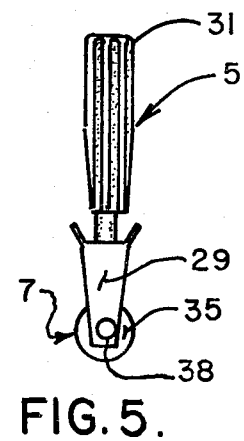

HEAT SEAL APPARATUS

BACKGROUND OF THE INVENTION

This invention relates to heat seal apparatus, and more particularly to such apparatus which includes a manually operable heated roller which may be pressed on a package or the like enwrapped with a suitable synthetic resin heat seal film or the like for heat sealing the film to itself or to the package.

In many heat seal applications, such as in wrapping packages on a packaging line, it is desirable to wrap the package in a covering of plastic film for protecting and sealing the package. As is well known, this plastic film is typically heat sealable to itself (or to the package) for securing the film in place on the package.

Heretofore, in relatively low volume operations (i.e., on non-automated packaging lines) it was conventional to use a portable heated roller having an insulated handle thereon which the user may roll across the film enwrapped around the package for heat sealing purposes. Such a portable heat sealing roller is shown in U.S. Pat. No. 3,857,015. However, while this prior art heat sealing roller worked well for its intended purposes, it will be appreciated that the necessity of locating an electric resistance heater within the roller presented substantial design difficulties. For example, since the roller rotated relative to the handle or frame of the heat sealing implement, it was necessary to provide some type of a rotary electrical connection for the heater. Also, it was necessary that the electric resistance heater be in heat transfer relation with the entire outer surfaces of the roller. Still further, it was necessary that the roller be connected to a source of electrical supply by a power cord which interfered with use of the roller.

Also known were heavy metal rollers rotatably mounted in a frame having a thermally insulated handle thereon wherein the solid metal roller of copper, aluminum, or other relatively highly heat conductive metal with a relatively high heat capacity, would be heated to a predetermined temperature level. Then, the user, free of an electrical cord, could readily apply the roller to a heat sealable film to be heat sealed. However, the necessity of utilizing a solid metal roller meant that these rollers were, in some instances, excessively heavy for ready manual use. If hollow metal rollers were used in an effort to lessen the weight of the roller, the roller would not have sufficient heat capacity to heat seal relatively large areas of heat sealable film without having to be reheated.

Thus, there has been a long-standing need for a lightweight, cordless manual heat seal roller which had sufficient heat capacity to heat seal relatively large areas of heat sealable film.

SUMMARY OF THE INVENTION

Among the several objects and features of the present invention may be noted the provision of a heat seal apparatus which utilizes a cordless roller wherein the roller is of light weight, and yet has sufficient heat sealing capability for heat sealing relatively large areas of heat sealable film;

The provision of such heat seal apparatus wherein the roller may be substantially uniformly heated even though an external heater is in heat transfer relation with only a portion of the roller;

The provision of such heat seal apparatus in which a heat storage medium is enclosed within the heat roller and in which the heat seal medium does not exert excessive vapor pressures when heated to temperature levels sufficient for heat sealing purposes;

The provision of such heat seal apparatus which includes control circuitry so as to prevent overheating when the apparatus is idling await use, and also when the roller is removed for use;

The provision of such heat seal apparatus which, when the roller is removed from the heater unit, causes the heater unit to be heated to an increased temperature level thereby to more rapidly restore the roller to its predetermined temperature level when the roller is replaced within the heater unit; and The provision of such heat transfer apparatus which is easy to use, which is reliable in operation, and which has a long service life.

Other objects and features of this invention will be in part apparent and in part pointed out hereinafter.

Briefly stated, the heat seal apparatus of the present invention is intended for heat sealing a synthetic resin film. The apparatus comprises stationary heater means having a heater therein, and a heat seal roller assembly including a manually graspable handle and a heat seal roller rotatably mounted with respect to the handle. At least a portion of the heat seal roller assembly is insertable into the heater means in which the heat seal roller is in heat transfer relation with the heater thereby to heat the heat seal roller to a predetermined temperature level suitable for heat sealing the film when brought into contact therewith, and a withdrawn position in which a user manually grasping the handle may readily roll the heated heat seal roller over the film thereby to heat seal the film. The heat seal roller comprises a cylindric, hollow tube of relatively high heat conductivity material and a heat storage medium sealed within the tube. The heat storage medium has a relatively low vapor pressure with respect to water at temperature levels above the predetermined temperature of the roller. Further, the heat storage medium has a specific heat ranging between about 0.3 and 0.8 Btu/pound/°F., and having a density ranging between about 50 and 75 pounds/ft$^3$.

BRIEF DESCRIPTION OF THE DRAWINGS

FIG. 1 is a perspective view of the heat seal apparatus of the present invention, including a stationary heater unit and a roller assembly removable therefrom;

FIG. 2 is a top plan view of the stationary heater unit with the roller assembly removed therefrom;

FIG. 3 is a vertical cross sectional view taken along line 3—3 of FIG. 2, illustrating an opening in the heater unit for receiving the roller (shown in phantom) of the roller assembly with a roller of the roller assembly in heat transfer relation with an electric resistance heater;

FIG. 4 is a front elevational view of the roller assembly with a portion of the roller broken away illustrating a heat storage medium sealed within the roller;

FIG. 5 is a side elevational view of FIG. 4;

FIG. 6 is a view showing a package enwrapped in heat sealable synthetic resin film with the film being heat sealed by the roller of the present invention;

FIG. 7 is an enlarged view of the end of the roller shown in FIG. 4, illustrating the securement of an end cap on the roller and of a port provided in the trunion of the end cap through which the heat storage medium is inserted within the roller;

Corresponding reference characters indicate corresponding parts throughout the several views of the drawings.

DESCRIPTION OF PREFERRED EMBODIMENTS

Figure 8:
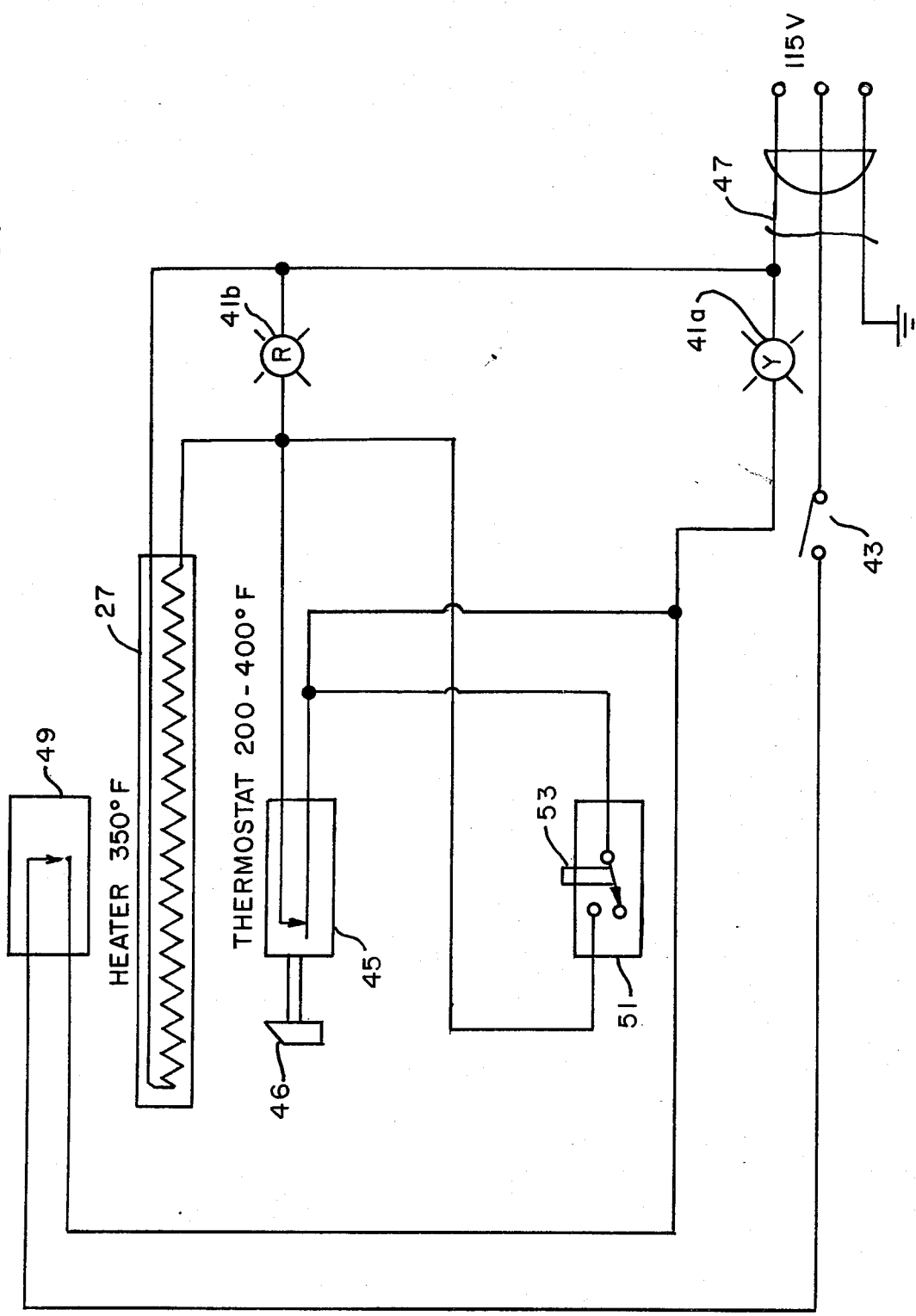
FIG. 8 is an electrical schematic of the circuit for energizing the heater and for controlling operation thereof.

Referring now to the drawings, the heat sealing apparatus of the present invention is indicated in its entirety by reference character 1. More specifically, the heat seal apparatus includes a heating unit, as generally indicated at 3, and a roller assembly 5 manually insertable into and removable from the heating unit 3. Roller assembly 5 includes a cylindric roller 7 which is preheated by the heating unit to a predetermined temperature level (e.g., 350° F.) suitable for heat sealing a package 9 (see FIG. 6) enwrapped with a suitable heat sealable synthetic resin (i.e., plastic) film 11. It will be appreciated by those skilled in the art that the heat seal apparatus of the present invention may be utilized with any conventional heat sealable film, but as the thickness and composition of the films are varied, it may be desirable to change the temperature level to which roller 7 is heated.

Referring now to the stationary heating unit 3, it is shown to comprise a cabinet 13 having a top wall 15, side wall 17, and a front wall 19. The cabinet 13 is supported by legs 21, and may be conveniently rested on a table, workbench, or the like. Cabinet top 15 includes a cantilever cover 22 extending out over a roller receiving opening 23 provided in the top of the cabinet. This roller receiving opening 23 is so sized as to readily receive the roller and at least parts of roller assembly 5 in the manner best shown in FIG. 1. Heating unit 3 further includes a curved roller support or cradle 25 located internally within cabinet 13 generally in register with roller receiving opening 23 so as to act as a cradle for roller 7. An elongate electric resistance heater 27 is provided adjacent roller support 25 so as to be in heat transfer relation with roller 7 substantially along the length thereof at the bottom portion of the roller. For example, an elongate cartridge electric resistance heater encased within a metal sheath may be utilized. Such cartridge-type heaters are well known in the art, and may be commercially obtained from, for example, Watlow Electric Company of St. Louis, Mo., under the trade name FIREROD.

Referring now to roller assembly 5, it is shown to comprise a frame 29 having a thermally insulated handle 31 secured to the center of the frame. The ends of the frame carry roller 7, as best shown in FIG. 4. Roller 7 comprises a cylindrical, hollow tubular roller body 33 of brass, copper, or other relatively high thermal conductivity metal or the like. Roller body 33 has a longitudinal cylindric axis A—A. As mentioned, the roller body 33 is a hollow tubular body having a roller wall 34 of sufficient thickness so as to give good mechnical rigidity to the roller. However, it will be understood that, in accordance with this invention, roller wall 34 need not provide any substantial amount of heat storage capacity for heat sealing purposes. The ends of the cylindrical, tubular roller body 33 are closed by end caps 35 which may be soldered or otherwise sealably secured in place relative to the ends of the tubular roller body 33. Each of the end caps 35 has a respective shoulder 36 and an aperture 37 coaxial with cylindric axis A—A. A tapered trunion 38 is forceably, sealably fitted in aperture 37 so as to extend axially outwardly coaxial with axis A—A.

In accordance with this invention, a desired quantity of a suitable heat storage medium 39 (as will be hereinafter disclosed in detail) may be poured or otherwise loaded into the interior of roller 7 via one of the holes 37. Then, after the desired quantity of heat storage medium 39 has been placed within the roller, the tapered trunions 38 may be inserted into apertures 37 and sealably secured relative to the end caps thereby to effectively seal the heat storage medium within the roller.

As shown in FIG. 4, heat storage medium 39 fills or substantially fills the volume of the tubular roller body 33. Generally, a sufficient space is allowed within roller 7 so as to permit some expansion of the heat storage medium. Also, with a space present within roller 7, the heated heat storage medium may be more uniformly distributed within the roller by physically shaking the roller. Heat storage medium 39 is an effective amount of a compound having a relatively high heat capacity and a relatively low vapor pressure at elevated temperatures thereby to substantially prevent the build-up of pressure within roller 7 when the roller is heated to its predetermined operating temperature level (e.g., 350° F. or more). A preferred heat storage medium 37 is a paraffin wax which is poured into the roller 7 via opening 38 in the manner heretofore described. Generally, any number of paraffin waxes may be utilized, depending on the desired ultimate predetermined operating temperature for the roller 7. Generally, paraffins are a mixture of solid (at room temperature) hydrocarbons having the general formula $C_nH_{2n+2}$, which is obtained from the refining of petroleum products. Generally, paraffins have a melting temperature of about 122°–135° F. (50°–57° C.), and have a relatively high boiling point, as compared to water (e.g., 400°–750° F. [204°–399° C.]). Moreover, paraffins typically have a density ranging between about 54–57 pounds/cubic foot, and have a specific heat of about 0.69 Btu/pound/°F. One type of paraffin which has been successfully used in this invention is commercially available from Farmland Industries, Inc. of Kansas City, Mo. under the trade designation Co-op Glo-Candle Wax.

Another heat storage medium 37 which may be used in the heat seal apparatus of the present invention is a commercially available heat transfer fluid available from Dow Chemical U.S.A., Midland, Mi., under the trade designation DOWTHERM G. Specifically, this heat transfer fluid is a proprietary mixture of di- and tri-aryl compounds which is light amber to brown in color and has a crystal point below about 20° F. (−7° C.) and an atmospheric reflux boiling point of about 575° F. (302° C.). This fluid is relatively stable at temperatures up to 700° F. (371° C.), and has a relatively low vapor pressure when heated. For example, this heat transfer fluid will exert a vapor pressure of about 30 psig when heated to 700° F. Moreover, this heat transfer fluid has an average molecular weight of about 215 and has a density of 9.15 pounds/gallons, or 68.4 pounds/- cubic foot at 75° F. Still further, this heat transfer fluid has a specific heat of about 0.4 Btu/pound/°F.

Those skilled in the art will recognize that certain inorganic salts may be used as the heat storage medium.

As mentioned heretofore, one of the primary objects of the heat seal apparatus of the present invention is to provide a heat seal roller which eliminates the necessity of an internally mounted electric resistance heater within the roller and the attendant power cord, and yet, which permits one to readily heat seal relatively large amounts of heat sealable film (e.g., all of the film in wrapping an average size package, as shown in FIG. 6) without the necessity of having to reheat the roller, and still further wherein the roller is of relatively light weight for ease of handling.

For example, a convenient size roller may be one having a diameter of about 1.5 inches (3.8 cm.) and a length of about 9.5 inches (24.1 cm.). If this roller were made of solid copper, it would have a weight of approximately 5.4 pounds (2.45 kg.), and the solid copper roller would absorb about 0.498 Btu's for every degree of Fahrenheit the roller is heated. If a similarly dimensioned roller were made of solid aluminum, the roller weight would be significantly decreased to about 1.64 pounds (0.74 kg.) and the aluminum roller would absorb about 0.36 Btu's for each degree of Fahrenheit it was heated. In contrast, if the hollow tubular roller body 33 of the present invention had an outside diameter of about 1.5 inches (3.8 cm.), an inside diameter of about 1.25 inches (3.2 cm.), and an overall length of 9.0 inches (22.9 cm.) (excluding end caps 35), the internal volume of the roller body would be about 11 cubic inches. With the interior of the roller body substantially filled with paraffin wax, the paraffin wax alone (i.e., ignoring the heat capacity of the metal walls of the roller body) would absorb about 0.234 Btu's for each degree Fahrenheit it is heated. If DOWTHERM G heat transfer medium were used in place of the paraffin, the heat transfer medium alone would absorb about 0.175 Btu's for each degree Fahrenheit it was heated. Of course, as can be appreciated, the additional heat capacity of the metal walls of the roller body 33 increases the overall heat capacity of roller 7 made in accordance with this invention, so as to be favorably comparable with solid metal rollers, as above described. However, the entire roller assembly 5 of the present invention weighs only about one pound, eleven ounces (0.31 kg). It has been found that roller 7, constructed as above-described, whether filled with paraffin (as is presently preferred) or with another organic heat storage medium (such as DOWTHERM G or the like) does have sufficient heat storage capability for effectively heat sealing average size packages without reheating, and yet does not generate such sufficiently high vapor pressures within the sealed roller as to constitute a substantial source of pressure.

Referring now to FIGS. 1 and 8, heating unit 3 includes a power warning lamp 41a and a heater energization lamp 41b. An on/off switch 43 is provided on the front wall 19 of cabinet 13 for turning the heater unit 3 on and off. A thermostatic temperature controller 45 is adjustable via a knob 46 at the front of the cabinet, thereby to ensure that heater 27 maintains roller 7 at a predetermined temperature level (e.g., 350° F.) when the roller assembly 5 is inserted within roller receiving opening 23 of the heating unit 3, and when the roller rests on roller support 25 and is in heat contact relation with heater 27. Electrical energy is supplied to heater unit 3 by means of an electrical power cord and plug 47, as shown in FIG. 8. A high temperature limit cut-out switch 49 is positioned adjacent heater 27 so as to de-energize the heater in the event the thermostat 45 becomes inoperative and excessive amounts of electrical energy are supplied to heater 27. For example, temperature limit switch 49 may be set to de-energize heater 27 upon the temperature of the heater exceeding a predetermined temperature of about 600° F.

In accordance with this invention, a so-called normally closed roller sensing switch 51 (see FIG. 8) is provided adjacent roller receiving opening 23 in heating unit 3 for sensing when roller assembly 5 is in its inserted position within the heating unit. More specifically, switch 51 includes an actuator button 53 (see FIGS. 1 and 2) which is engaged by handle 31 of the roller unit so as to open switch 51 and to permit heater 27 to be controlled by thermostat 45. Upon removing roller unit 5 from heater unit 3, switch 51 will close thus shorting out thermostat 45 and continuously supplying full line voltage to heater 27. This, in turn, permits heater unit 27 to heat itself and the surrounding structure (i.e., roller support 25) to a temperature (e.g., 425° F.) somewhat above its normal operating temperature (e.g., 350° F.) while the roller assembly 5 is removed from heat unit 3 so that upon reinserting the roller assembly within the heater unit, heater 27 will be heated to a substantially elevated temperature thereby facilitating the rapid reheating of roller 7. It will be appreciated that if thermostat 45 merely maintains heater 27 at its predetermined temperature level (e.g., 350° F.) when the roller assembly is removed, it will take an appreciably longer time to restore the now somewhat cooled-off roller 7 when the roller assembly is returned to the heating unit after use. By heating heating element 27 to a higher predetermined temperature level, the time required to reheat roller 7 is appreciably reduced. Of course, if roller 5 is not promptly returned to heater unit 3, temperature limit switch will prevent overheating of heater 27.

Figure 9:
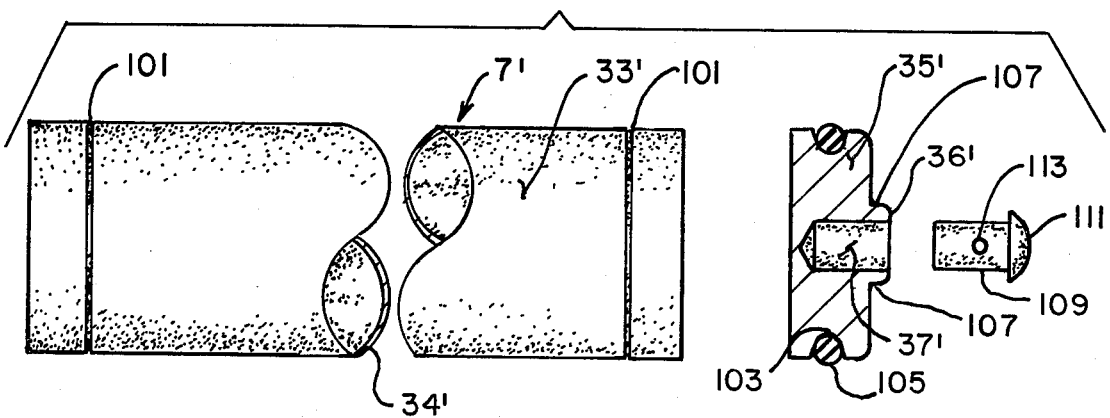
FIG. 9 is an exploded view of another embodiment of the roller assembly illustrating another (and possibly a) preferred method of sealing the heat storage medium within the roller.
Figure 10:
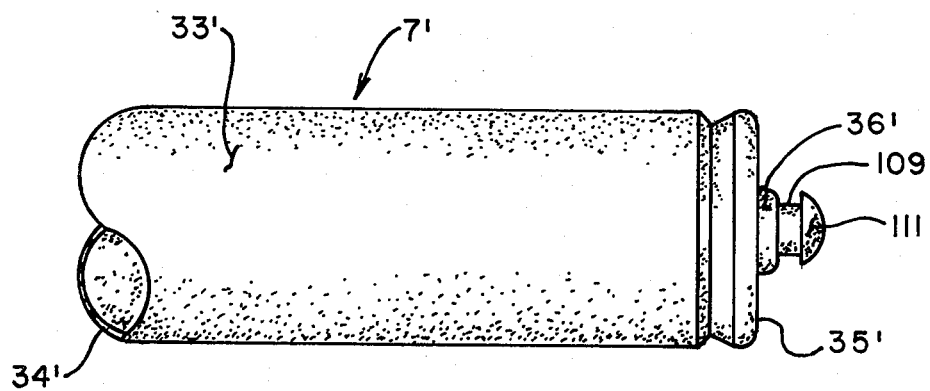
FIG. 10 is a view similar to FIG. 9 illustrating the end of the roller after the end cap has been swaged in place on the roller.

Referring now to FIGS. 9 and 10, an alternate and preferred embodiment of the roller is indicated in its entirety by reference character 7'. It will be understood that the "primed" reference characters in FIGS. 9 and 10 indicate parts having a similar construction and function as parts heretofore described. More specifically, roller body 33' is shown to be a hollow metal tube of brass or other good heat conductive metal. As shown in FIG. 9, an inwardly projecting shoulder 101 is formed in the wall 34' of roller 33' proximate each end thereof. End cap 35' is shown to have a circumferential groove 103 therein which receives an elastomeric O-ring 105. After roller 33' is filled with a heat storage medium, the outer end of roller body 34' is swaged onto end cap 35' such that O-ring 105 is compressed so as to positively seal the heat storage medium within the roller. End cap 35' has a blind bore 37' therein having a shoulder 36' projecting out beyond the end face of the end plate. Oblique apertures 107 angle inwardly toward bore 37' through shoulder 36'. A pin 109 is received within bore 37', the pin having an enlarged head 111. Pin 109 has a pair of opposed oblique holes 113 therein for receiving a staking pin (not shown) inserted into oblique apertures 107 thereby to positively locate pin 109 relative to end cap 35' and to loosely journal roller 7' on frame 29.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. Heat seal apparatus for heat sealing synthetic resin film, said apparatus comprising stationary heater means having a heater therein and a heat seal roller means including a manually graspable handle and a heat seal roller rotatably mounted with respect to said handle, said heat seal roller means being insertable at least in part into said heater means so that said heat seal roller is in heat transfer relation with said heater thereby to heat said heat seal roller to a predetermined temperature level suitable for heat sealing said film when brought into contact therewith, said heat seal roller means being withdrawable from said heater means so that a user manually grasping said handle may readily roll said heated heat seal roller over said film thereby to heat seal said film, said heat seal roll comprising a hollow cylindric tube of relatively high heat conductivity material and a heat storage medium sealed within said tube, said heat storage medium having a relatively low vapor pressure with respect to water at temperatures at or above said predetermined temperature of said roller, said heat storage medium having a specific heat ranging between about 0.3 and 0.8 Btu/pound/°F., and having a density ranging between about 50 and 75 pounds/foot$^3$.

2. Heat seal apparatus as set forth in claim 1 wherein said heat storage medium has a melting temperature between about 0° F. and 212° F., and a boiling point above said predetermined temperature level of said roller.

3. Heat seal apparatus as set forth in claim 2 wherein said heat storage medium is an organic compound.

4. Heat sealing apparatus as set forth in claim 3 wherein said heat storage medium is paraffin.

5. Heat sealing apparatus as set forth in claim 3 wherein said heat storage medium is a mixture of di- and tri-aryl compounds.

6. Heat sealing apparatus as set forth in claim 1 wherein said heater is an electric resistance heater, and wherein said stationary heater means comprises means for sensing the removal of said heat seal roller from said heating means and for heating said heater to a temperature above said predetermined temperature level thereby to facilitate reheating of said roller when the latter is returned to said heating means.

* * * * *